(12) United States Patent
Barsness et al.

(10) Patent No.: US 7,085,758 B2
(45) Date of Patent: Aug. 1, 2006

(54) DATABASE ENABLED MESSAGING FACILITY

(75) Inventors: Eric L. Barsness, Pine Island, MN (US); Richard D. Dettinger, Rochester, MN (US); Brian E. Olson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 10/225,843

(22) Filed: Aug. 22, 2002

(65) Prior Publication Data

US 2004/0039742 A1 Feb. 26, 2004

(51) Int. Cl.
G06F 17/30 (2006.01)
G06F 15/16 (2006.01)

(52) U.S. Cl. ............................. 707/4; 707/10; 709/219

(58) Field of Classification Search .................... 707/3, 707/4, 10; 709/217, 219, 227
See application file for complete search history.

(56) References Cited

U.S. PATENT DOCUMENTS 5,765,028 A * 6/1998 Gladden ..................... 706/25
5,857,192 A * 1/1999 Fitting ......................... 707/200
6,012,098 A * 1/2000 Bayeh et al. ................ 709/246
2003/0182391 A1* 9/2003 Leber et al. ................. 709/217

OTHER PUBLICATIONS

IBM TDB Grouping (Batching) Database Update Requests, IBM technical disclosure Bulletin, Apr. 1990, No. 32, Issue 11, p. 84.*

* cited by examiner

Primary Examiner—Jack M. Choules
(74) Attorney, Agent, or Firm—Patterson & Sheridan, LLP

(57) ABSTRACT

The present invention provides methods and systems for accessing a database with a database-enabled messaging facility. An application on a front-end server may access a database located on a back-end server via the database-enabled messaging facility. In general, the database-enabled messaging facility receives a message containing a database request from the front-end server, parses the message to extract the database request, submits the database request to the database, receives results from the database request and sends a message containing results from the database request to the front-end server. For some embodiments, the messaging facility may optimize-accessing the database by changing database requests-prior to submitting them to the database. For example, the messaging facility may reorder database requests, delete redundant database requests, or combine database requests to minimize a total number of database accesses.

28 Claims, 5 Drawing Sheets

DATABASE ENABLED MESSAGING FACILITY

BACKGROUND OF THE INVENTION

1. Field of the Invention

The present invention generally relates to messaging facilities and, more particularly, to messaging facilities capable of accessing a database.

2. Description of the Related Art

Front-end and back-end are terms that may be used to characterize program applications and services relative to a user of these applications and services. A front-end application is one that application users (i.e., a human being or another application) interact with directly. Commonly, the front end application is running on a local computer system (a front-end server) while the back end application is running on a remote computer system (a back-end server). In client-server terms, a front-end server would typically correspond to a client while a back-end server would typically correspond to a server. The back-end application may interact directly with the front-end application or, perhaps more typically, may interact with the front-end application through an intermediate program (i.e., middleware), such as a messaging facility.

A messaging facility is a program that provides inter-program communication, allowing two or more programs, such as a front-end and a back-end application, to send and receive application-specific data without having a direct connection established between the sending and receiving programs. Via a messaging facility, the front-end and back-end applications may agree to use particular named message queues and then communicate by sending messages to and receiving messages from the agreed-upon message queues. A message queue is a named object in which messages accumulate and from which they are later removed.

Applications have access to message queues by using message queuing API calls—obtaining message queuing services by using the message queuing calls to communicate with the queue manager that is installed on the same system as the application (i.e., the local queue manager). The locations of these queues need not be apparent to the applications which send the messages; each application interacts only with a local copy (i.e., an instance) of the messaging facility. In this way, messaging facilities simplify the level of complexity that is required of the application programs, removing the need for them to implement their own complex communications controls.

One common messaging paradigm is a networked database environment that includes a front-end application sending data to a back-end application to access a database on a remotely located back-end server. Databases are computerized information storage and retrieval systems. One common database is known as a relational database management system (RDBMS), which is a computer database management system that uses relational techniques for storing and retrieving data. Typically, the database contains data in the form of tables (formally denominated "relations") stored for use on disk drives or similar mass data stores. A "table" includes a set of rows (formally denominated "tuples" or "records") spanning several columns. Data in the tables is typically stored, retrieved and deleted using high-level query languages, such as the Structured Query Language (SQL). Reference is made to C. J. Date, *An Introduction to Database Systems*, 6th edition, Addison-Wesley Publishing Co. Reading, Mass. (1994) for a comprehensive general treatment of the database art.

In a common implementation, the back-end application supports the front-end application by being located close to the database (i.e., on the same machine) and by interfacing with the database. Typically, both the front-end application and the backend application are customized in order to recognize the message formats from each other. FIG. 1 illustrates an exemplary networked data environment 100 comprising a front-end server 110 and a back-end server 120.

The front-end server 110 includes a custom front-end application 112 that communicates with a custom back-end application 122 to access a database 130 on the back-end server 120. The front-end application 112 may access the database 130, for example, in response to user input received via a user interface 150. As previously described, a user may be another application or a human being. Accordingly, the user interface 150 may be an interface to another application or an interface for a human user, such as a graphical user interface (GUI) or, more specifically, a web browser to receive input from a user connected to the Internet.

In general, to access the database 130, the custom front-end application 112 generates parameters the back-end application 122 can use to construct a database request. For example, the parameters may include sufficient information to construct an SQL statement. The front-end application 112 places the parameters in a formatted message and places the message in a send queue 116 of a front-end messaging facility 114. The front-end messaging facility 114 sends the message from the send queue 116 to a receive queue 128 of a back-end messaging facility 124 via a dedicated channel 140, for example, established over a network connection (e.g., a TCP/IP connection). The custom back-end application 122 may then retrieve the message from the receive queue 128 and parse the message to extract the parameters in order to construct the database request. Once the database request (e.g., the SQL statement) is constructed, the custom back-end application 122 submits the request to the database 130.

After receiving results from the database request (i.e., requested data or success/failure of an update request), the custom back-end application 122 creates a formatted message containing the results and places the message in a send queue 126 of the back-end messaging facility 124. The back-end messaging facility 124 sends the message from the send queue 126 to a receive queue 118 of the front-end messaging facility 114. The front-end application 112 may then retrieve the message from the receive queue 118 and post the results to the user interface 150.

While the back-end application 122 provides an interface between the front-end application 112 and the back-end database 130, one disadvantage of this approach is that development efforts are required to develop both the front-end application and the back-end application. Prior to developing the applications, a protocol must be defined that specifies, for example, the parameters necessary to construct the database request and how to place the parameters in the message. After development, the applications are typically thoroughly tested in an effort to ensure proper operation. Further, if different parties are engaged to develop the front-end and back-end applications, a great deal of human communication may be required, which may contribute to significant inefficiencies. As a result, it would be preferable to eliminate or reduce the overhead involved in the definition, development, and testing typically required to provide an interface between a front end application and a backend database.

Accordingly, there is a need for an improved method and system for providing an interface between a front-end application and a back-end database.

SUMMARY OF THE INVENTION

The present invention generally provides-methods and systems for accessing a database with a messaging facility.

A first embodiment provides a method for accessing a database by a messaging facility. In general, the database and the messaging facility are located on a back-end server. The method generally comprises, by the messaging facility: receiving a message containing a database request, parsing the message containing the database request to extract the database request, submitting the database request to the database, receiving results from the database request, and sending a message containing results from the database request to the front-end server. For some embodiments, parsing the message containing the database request comprises extracting the database request from the message as text. For other embodiments, parsing the message containing the database request comprises decoding the encoded database request. For some embodiments, the messaging facility may optimize database requests by deleting redundant requests and/or combining database requests.

In another embodiment, the foregoing method is implemented by executing a program contained on a computer readable medium.

Yet another embodiment provides a database system comprising a front-end server and a back-end server. The front-end server generally comprises a first messaging facility and an application configured to access a database located on the back-end server by sending messages containing database requests to the back-end server via the first messaging facility. The back-end server generally comprises the database and a second messaging facility configured to receive the messages containing database requests from the application, parse the messages to extract the database requests, submit the database requests to the database, and send messages containing the results from the database requests to the front-end server.

Yet another embodiment provides a method for processing database requests. The method generally comprises receiving a plurality of messages containing database requests in a message queue, analyzing the database requests, changing the database requests, and transmitting the database requests to a database. Changing the database requests may comprise reordering the database requests, deleting at least one of the database requests, or combining at least two of the database requests into a single database request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides embodiments for accessing a database from a messaging facility. Applications running on a front-end server may access a database located on a back-end server through the messaging facility, thereby reducing or eliminating costly development of custom back-end applications. The messaging facility may receive messages containing database requests in a message queue. For some embodiments, the messages in the message queue may be reordered in an effort to optimize accessing the database.

Figure 1:
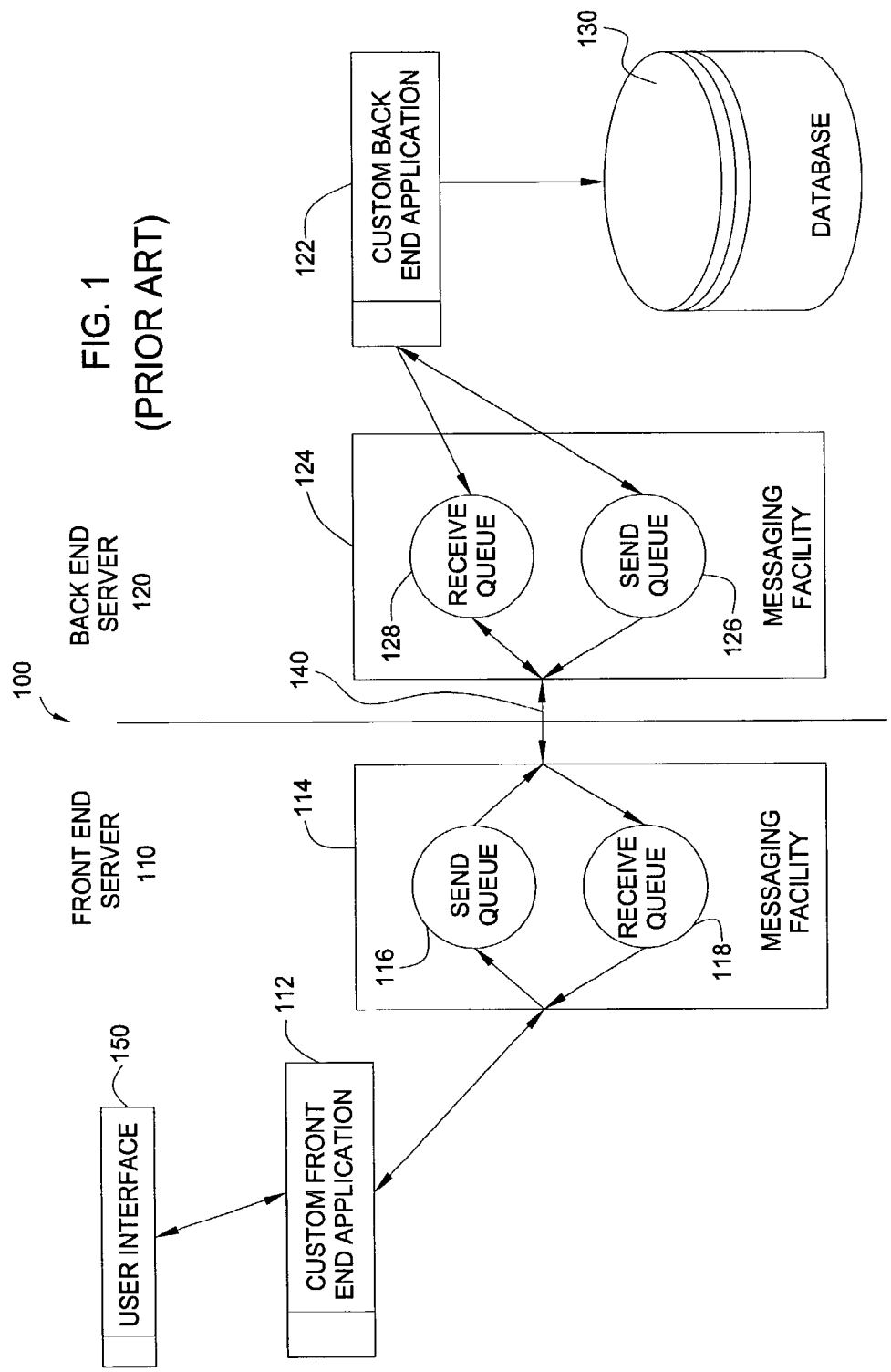
FIG. 1 illustrates an exemplary networked database environment according to the prior art.
Figure 2:
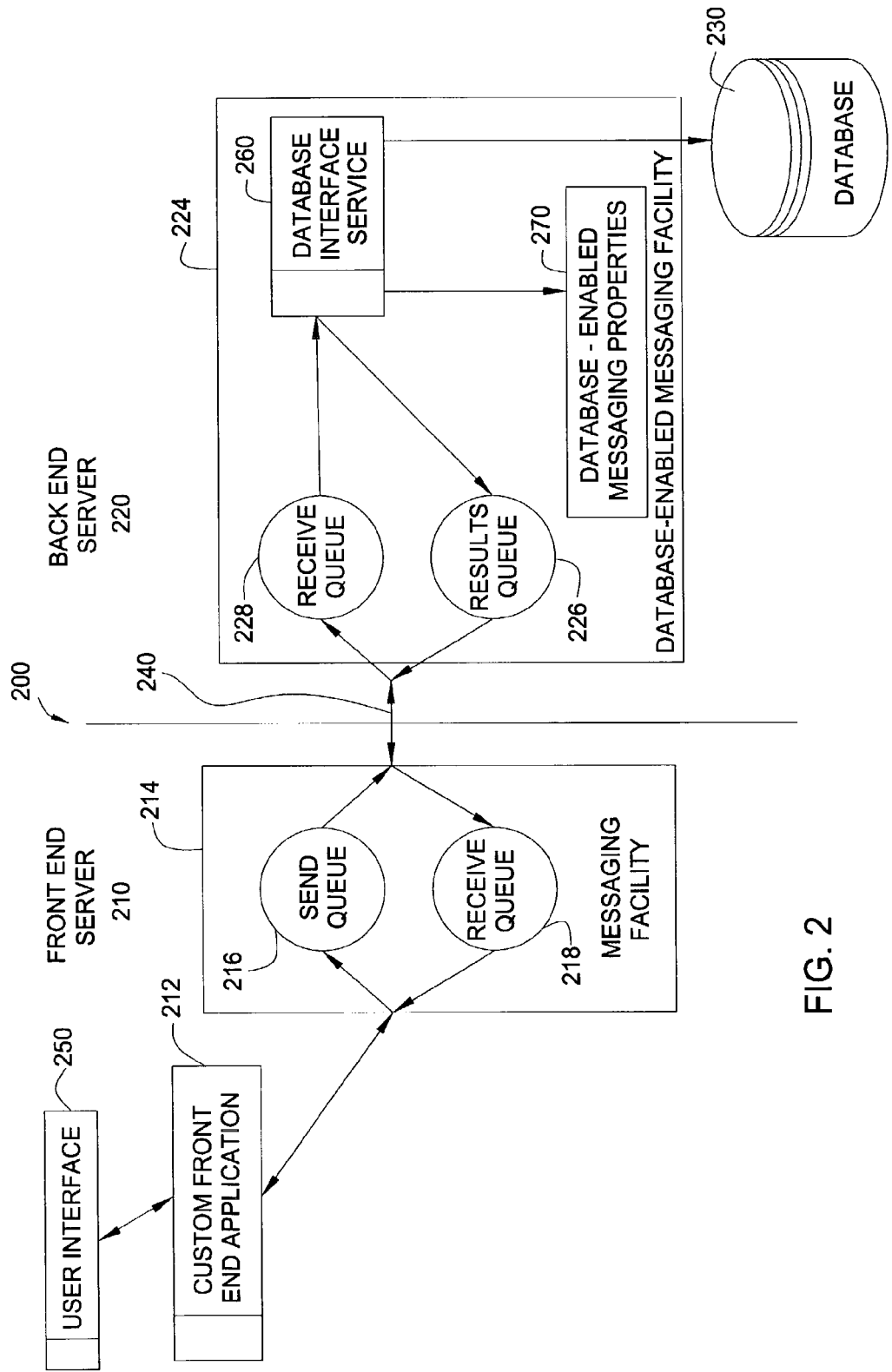
FIG. 2 illustrates an exemplary networked database environment according to an embodiment of the present invention.

One embodiment of the invention is implemented as a program product for use with a computer system such as, for example, a computer system of the database environment 200 shown in FIG. 2 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to as a "program", "application", "server", or other meaningful nomenclature. The inventive computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention may be implemented within many different data processing systems and communications systems. The invention may be implemented in a computer program product which is adapted for use with any computer. For example, suitable data processing systems in which the invention may be used are IBM's RISC System/6000 computers, eSeries computers, iSeries computers, pSeries computers, zSeries computers, etc. Illustrative operating systems which may be used to advantage include IBM's AIX operating system, IBM's OS/390, Red Hat's Linux and Microsoft Corporation's Windows. (Red Hat, Linux and Windows are registered trademarks of Red Hat, Inc., Linus Torvalds and Microsoft Corporation, respectively.)

According to one embodiment, the invention is implemented in a message-oriented middleware (computer program) product such as a product within IBM's Websphere MQ family of commercial messaging software products. The products within the Websphere MQ product family are each adapted to run on a specific one of a large number of different hardware and operating system platforms. Any one of these Websphere MQ products may implement the invention. More generally, any messaging product may be used to advantage including, for example, Java Messaging Service (JMS). In another embodiment, the invention is implemented as a stand-alone product which may be used in tandem with message-oriented middleware such as IBM's Websphere MQ family of software products. (IBM, Websphere MQ, RISC System/6000, PS/2, OS/390, eSeries, iSeries, pSeries, zSeries, and AIX are trademarks of International Business Machines Corporation.)

Using the communications support of a messaging facility (such as IBM's Websphere MQ products), a front-end application may access a back-end database via message queues, as will be described with reference to FIG. 2. FIG. 2 illustrates a networked data environment 200 comprising a front-end server 210 and a back-end server 220 in communication with one another. The front-end server 210 and back-end server 220 may each represent a computer, such as the ones described above, and may each include a processor, memory, storage, I/O devices, and the like. A front-end application 212 running on the front-end server 210 may need to access data on a database 230 on the back-end server 220.

Illustratively, the front-end application 212 may be a business application run by a system user and the back-end database 230 contains data related to the business application. As an example, the front-end application 212 may be an inventory management system run by a manufacturer or reseller and the database 230 may contain quantities of products stock, quantities or products to be built, promise dates of shipments, etc. As another example, the front-end application 212 may be an airline passenger booking service run by a travel agency and the database 230 may contain passenger information, passenger itineraries, flight and fare information. As yet another example, the front-end application 212 may be a human resources management system and the database 230 may contain personnel data.

Generally, however, the front-end application 212 may be any suitable application that accesses data on the back-end database 230. The front-end application 212 may receive input from an end user via a user interface 250, which may be any suitable interface. As previously described, for some embodiments, the user interface 250 may be a web browser. The database 230 may be any suitable database. For example, the database 230 may be a relational database, such as the DB2 database available from IBM. (DB2 is a trademark of IBM).

As illustrated, the front-end server 210 is configured with a front-end messaging facility 214 and the back-end server 220 is configured with a database-enabled (DBE) messaging facility 224. In general, the front-end application 212 accesses the database 230 by sending a formatted message containing a database request (a "database request message") from the front-end messaging facility 214 to the DBE messaging facility 224. The DBE messaging facility 224 parses the message and issues the request to the database 230. After receiving results from the database request, the DBE messaging facility 224 sends a message containing the results to the front-end messaging facility 214, where the results message may be retrieved by the front-end application 212.

Therefore, in contrast to the prior art, the front-end application 212 is able to access the database 230 without the need for a custom back-end application. As a result, the defining, development, and testing typically required in providing a back-end application for interfacing a front-end application with a back-end database is eliminated. Instead, the DBE messaging facility 224 is itself responsible for parsing messages containing database requests from the front-end application and accessing the database 230. In other words, the DBE messaging facility 224 may provide a standard interface between the front-end application 212 and the database 230.

In order to access the database 230, the DBE messaging facility 224 may include a database interface service 260. Generally, the database interface service 260 retrieves database request messages from a receive queue 228, parses the message to extract the request, and issues the request to the database 230. After receiving results of the request (i.e., requested data or success/failure of an operation), the database interface service 260 places a formatted message containing the results in a results queue 226. The detailed operation of the database interface 230 may be determined by parameters contained in database messaging properties 270, which may be contained, for example, in a configuration file or any suitable data structure.

Figure 3:
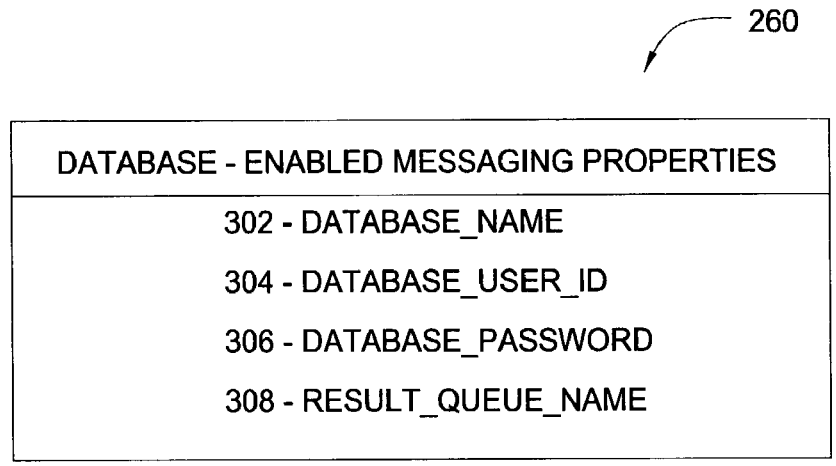
FIG. 3 illustrates one embodiment of a data structure for defining database-enabled messaging properties.

FIG. 3 illustrates one embodiment of a data structure containing the database messaging properties 270. As illustrated, the database messaging properties 270 may include parameters for a database name 302, a database userID 304, a database password 306, and a results queue name 308. The database name 302 may specify a database for the database interface service 260 to access in response to receiving database request messages in the receive queue 228 (i.e., the database targeted by the front-end application). The database userID 304 and password 306 may be used in establishing a database connection with the named database, as a specific user. For example, different users may have different levels of access to a database (i.e., some users may have read-only access or limited access to certain records or tables). The result queue name 308 may specify a named results queue for placement of messages containing results of the database requests.

It should be noted that the parameters illustrated in FIG. 3 are illustrative only and, for different embodiments, the database messaging properties 270 may include fewer, greater or different parameters than those illustrated. Further, for some embodiments, database messaging parameters may be embedded in a database request message. While, embedding database parameters in a database request message may increase the overhead associated with parsing each message, for some applications the increased overhead may be acceptable.

Figure 4:
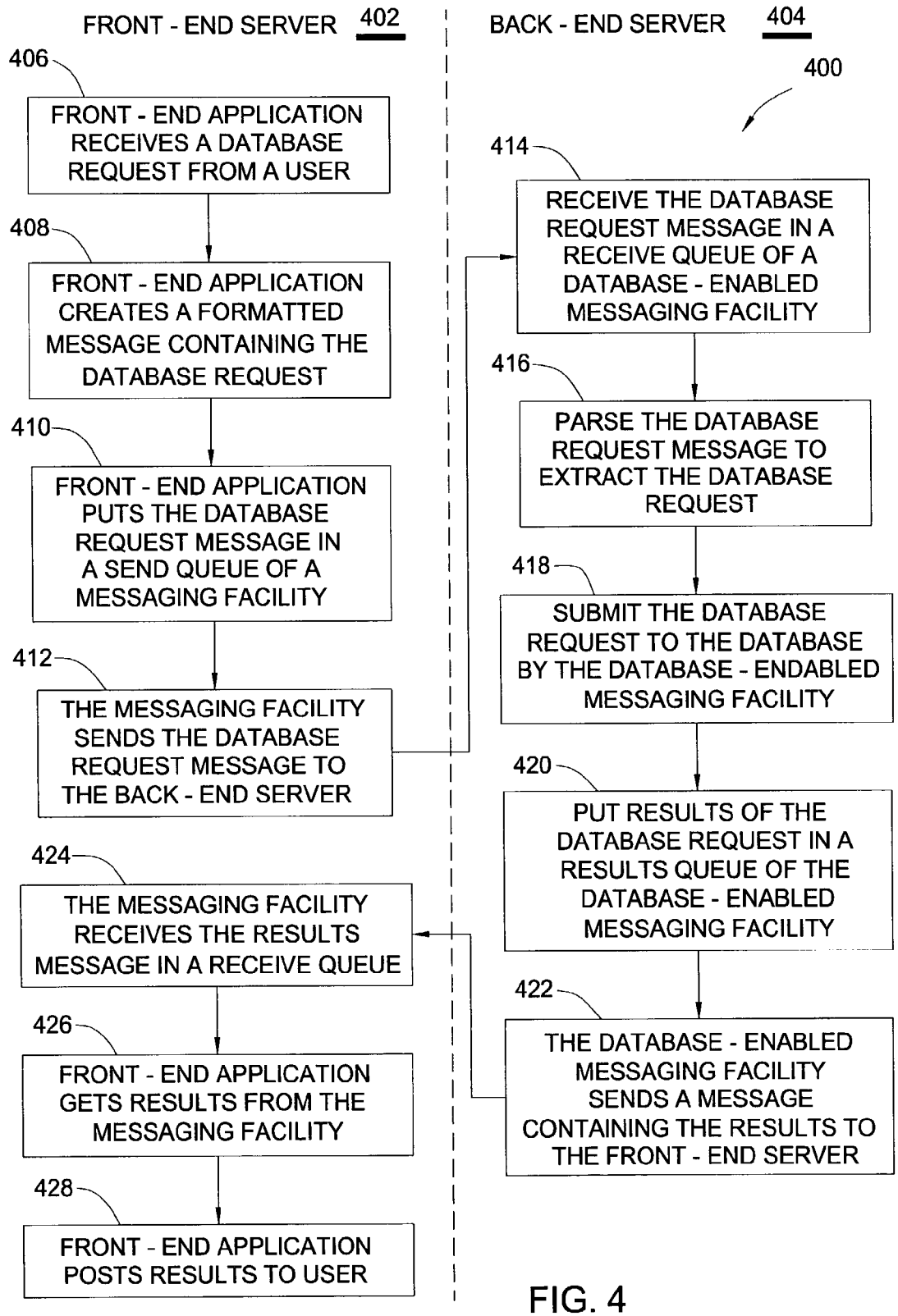
FIG. 4 is a flow diagram illustrating exemplary operations of a method for accessing a database with a messaging facility according to one embodiment of the present invention.

Operations of the database-enabled messaging facility 224 may be described with reference to FIG. 4, which is a flow diagram illustrating exemplary operations of a method 400 according to one embodiment of the present invention. As illustrated, the method 400 comprises a front-end server routine 402 (i.e., illustrative steps taken by the front-end server 210) and back-end server routine 404 (i.e., illustrative steps taken by the back-end server 220).

The method 400 is initiated at step 406 when the front-end application 212 receives a database request from a user. For example, the user may send a request to the front-end application 212 to update the database 230 via the user interface 250. The request may be to query the database 230 in order to retrieve data or the request may be to insert or delete data (e.g., rows in a table) from the database 230. For some embodiments, the front-end application may construct a database request (e.g., an SQL statement) in response to user input. For other embodiments, the front-end application 212 may receive the constructed database request.

At step 408, the front-end application 214 creates a formatted message containing the database request. The formatted message typically consists of message header and application data. The message header contains information about the attributes of a particular message and accompanies the message between application programs. Within the message header is typically a message descriptor, which contains such information as a message type, persistence, priority, accounting information, and a reply to queue. For some embodiments, the message descriptor may identify the message as containing a database request.

Figure 5:
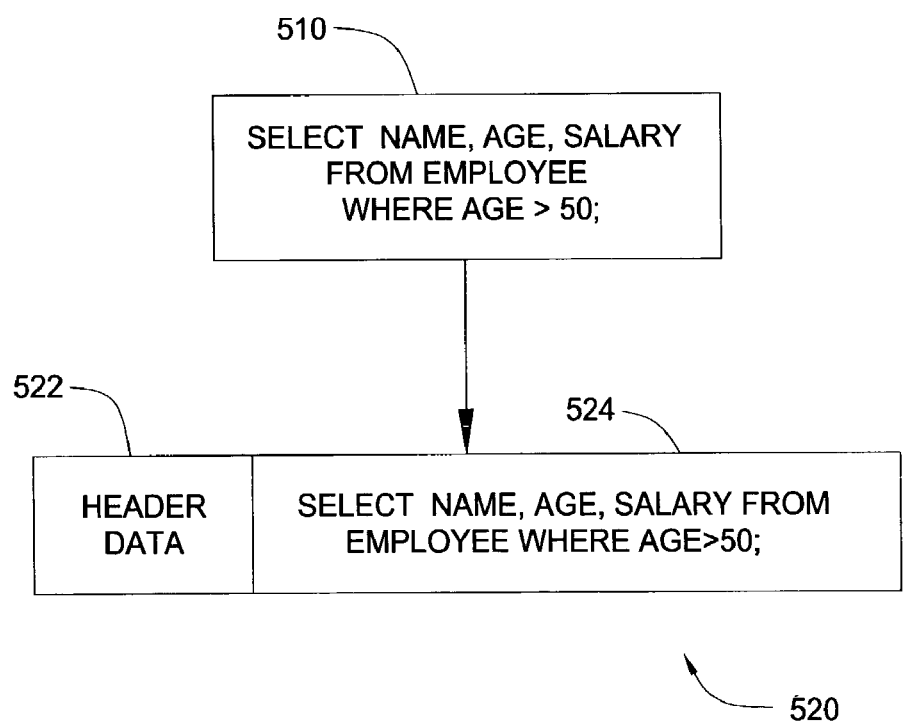
FIG. 5 illustrates one embodiment of a formatted message containing a database request.

Any suitable technique may be used to embed the database request in the formatted message. For some embodiments, a database request may be embedded into a formatted message as text. For example, FIG. 5 illustrates an exemplary database request 510 (as illustrated, an SQL statement) embedded into the application data 524 of a formatted message 520, as plain text. An advantage to embedding the database request as text may be simplified parsing of the message by the database interface service 224. However, for other embodiments, the database request may be encoded and/or compressed, using any number of techniques, including well-known techniques. Further, for some embodiments, the database request message may contain parameters for constructing the database request, rather than the entire request.

Referring back to FIG. 4, at step 410, the front-end application 212 puts the database request message in a send queue 216 of the front-end messaging facility 214. At step 412, the front-end messaging facility 214 sends the database request from the send queue 216 to the receive queue 228 of the database-enabled (DBE) messaging facility 224 on the back-end server 220.

At step 414, the DBE messaging facility 224 receives the database request message in the receive queue 228. At step 416, the DBE messaging facility 224 parses the database request message to extract the database request. For example, if the database request was embedded in the message as simple text, the database interface service 260 may simply treat the application data portion of the message as a database request (i.e., extract the text). Alternatively, if the database request was encoded or compressed prior to being embedded in the message, the database interface service 260 may decode or decompress the database request. Further, if the database request message contained parameters for constructing the database request, the DBE messaging facility may extract the parameters and construct the database request from the extracted parameters.

At step 418, the DBE messaging facility 224 submits the database request to the database 230. Prior to submitting the database request to the database 230, the DBE messaging facility 224 may be required to establish a connection with the database 230. Accordingly, the database interface service 260 may first establish a connection with the database 230. As previously described, for some embodiments, the database interface service 260 may establish a connection with a database named in the database messaging parameters 270.

At step 420, the DBE messaging facility 224 put a message containing the results of the database request (the "results message") in the results queue 226. As previously described with reference to the database request message, the results may be embedded in the results message according to any suitable technique (e.g., as plain text, encoded and/or decoded). At step 422, the DBE messaging facility 224 sends the results message from the results queue 226 to a receive queue 218 of the message in a receive queue 226. At step 426, the front-end application 214 gets the front-end messaging facility.

At step 424, the front-end messaging facility 214 receives the results message from the front-end messaging facility 214. At step 428, the front-end application posts the results to the user interface 428. For example, the front-end application may post data (i.e., product information, employee information, etc.) received as results from the database request to the user interface 250. Alternatively, if the database request was to update a table in the database 230, the front-end application may post the success or failure of the update request. A failure of the update request may be caused by a number of reasons. For example, the database user specified in the database messaging properties may not have access to update the database 230, as requested.

In some embodiments, the DBE messaging facility 224 may not generate a results message for every database request message it receives. For example, for some embodiments, the DBE messaging facility 224 may be configured to generate a results message only if the results include data requested from the database. If the database request was to update the database, however, the results may simply be a success or failure of the update request, and the DBE messaging facility 224 may not generate a message. For some embodiments, the DBE messaging facility 224 may generate a results message only if a database update request fails.

Figure 6:
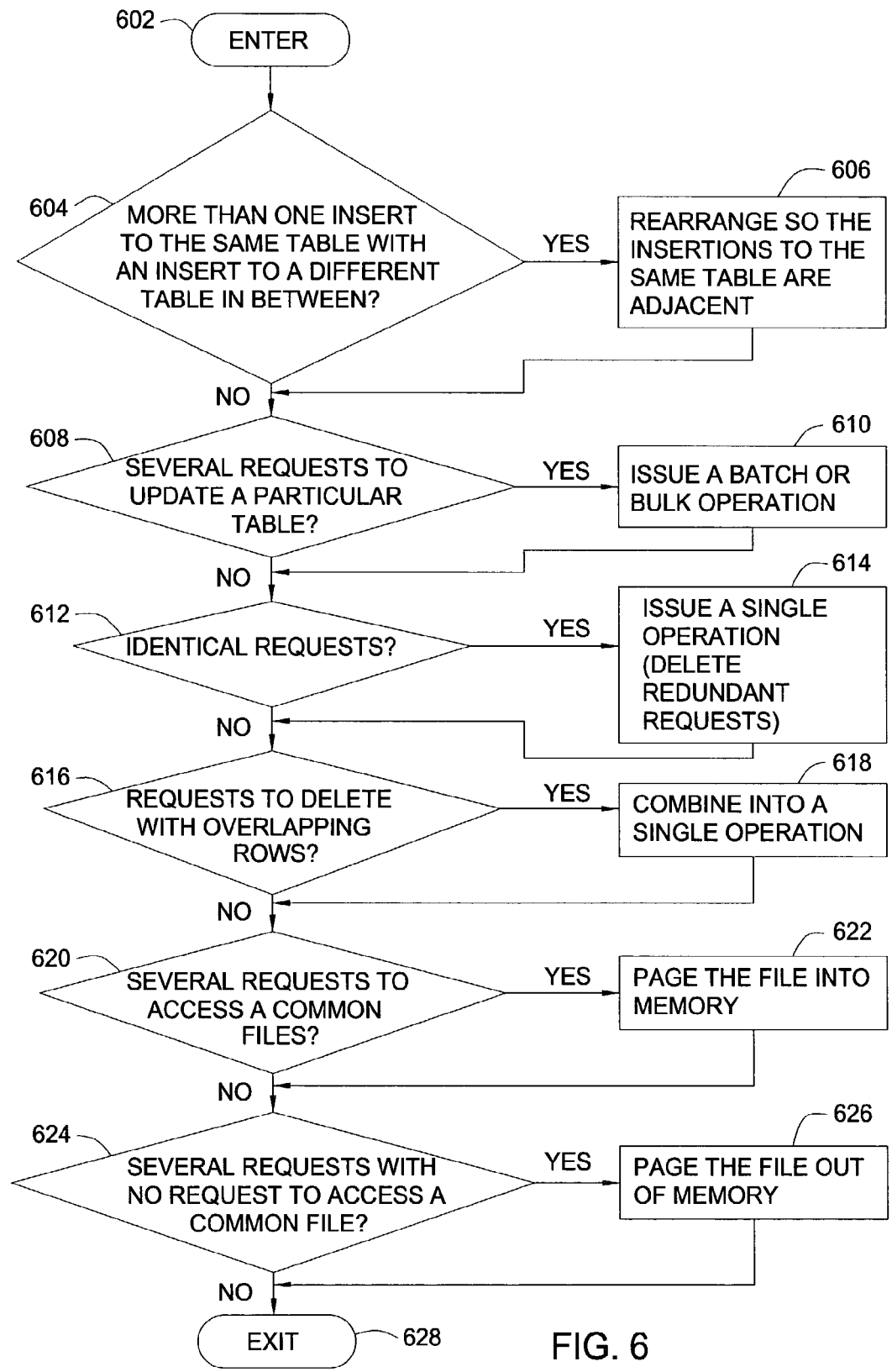
FIG. 6 is a flow diagram illustrating exemplary operations of a method for optimizing database operations according to one embodiment of the present invention.

In some embodiments, an advantage to accessing a back-end database via a database-enabled messaging facility is a potential optimization of database access requests. For example, the database-enabled messaging facility 224 may monitor a number of database request messages accumulated in the receive queue 228 and control an order in which they are issued, as well as delete and/or combine requests, in an effort to optimize (i.e., speed operations) accessing the database 230. FIG. 6 is a flow diagram illustrating exemplary optimizations that may be performed by a database-enabled messaging facility. The method 600 begins at step 602.

At step 604, the DBE messaging facility determines if the receive queue contains more than one request for an insertion to the same table with a request for an insertion to a different table in between. If so, the messaging facility may rearrange an order in which the database requests are issued so the insertions to the same table are adjacent at step 606. Further, if a final insertion would overwrite one or more intermediate insertions, the DBE messaging facility may delete the intermediate insertions.

At step 608, the DBE messaging facility determines if the receive queue contains several requests to update a particular table. If so, the messaging facility may combine the several requests and issue a single batch or bulk operation, at step 610. Combining several requests into a single operation may be particularly useful to replicate a table and/or merge more than one table together. For example, while it may be simpler for the front-end application to send several database request messages to implement the replication and/or the merger, issuing the several database requests may be inefficient. However, the DBE messaging facility may combine these database requests to offset some of the inefficiency.

At step 612, the DBE messaging facility determines if the receive queue contains any identical requests. If so, the DBE messaging facility may delete redundant operations and issue a single operation at step 614. For example, more than one request to delete the same row in a table would be redundant and a single delete operation may be issued. At step 616, the DBE messaging facility determines if the receive queue contains requests for deletion with overlapping rows. If so, the DBE messaging facility may combine the requests into a single operation at step 618.

The DBE messaging facility may also perform operations to optimize disk I/O operations. At step 620, the DBE messaging facility determines if the receive queue contains several requests to access a common file. If so, the DBE messaging facility may page the entire file into memory (i.e., a cache) at step 622. Paging the entire file into memory may reduce a total number of relatively slow disk I/O operations and speed database access. Subsequently, at step 624, if the DBE messaging facility determines the file is not accessed by any of several requests in the receive queue, the DBE messaging facility may page the file out of memory at step 626. An exact number of requests that constitutes several requests may vary, for example, with an amount of memory available for caching. Therefore, for some embodiments, the DBE messaging facility may determine a threshold number of requests to access a common file before paging the file into memory based on an amount of memory available for caching.

The method is exited at step 628. The operations of FIG. 6 may be repeated as necessary. For example, the operations of FIG. 6 may be repeated every time a new message is received in the receive queue, every time a threshold number of new messages is received in the receive queue, or periodically based on time. Further, for different embodiments, any number of different combinations of the operations illustrated in FIG. 6 may be repeated.

For some embodiments, rather than submit requests to update the database immediately, a DBE messaging facility may be configured to maintain (i.e., not submit) a number of requests to update the database in the receive queue until a front-end application issues a request to commit (i.e., make permanent) the update requests to the database. For some embodiments, DBE messaging facilities configured to receive commit requests may facilitate the implementation of a two-phase commit protocol in a system with a number of independent databases.

In general, a two-phase commit protocol would permit updates to the independent databases to be committed (made permanent) or rolled back (discarded) as a unit. To implement the two-phase commit protocol, a DBE messaging facility may serve as an interface between a front-end application and each database. During a first phase, the front-end application may ask the DBE messaging facilities if they are ready to commit updates. If all DBE messaging facilities respond positively, they may be asked to commit their updates in the second phase. Otherwise, the DBE messaging facilities may be asked to roll back their updates in the second phase.

Accordingly, embodiments of the present invention provide a database-enabled messaging facility for interfacing between a front-end application and a backend database. The database-enabled messaging facility may eliminate a need for custom back-end development and may, therefore, improve the cost effectiveness the design cycle.

While the foregoing is directed to embodiments of the present invention, other and further embodiments of the invention may be devised without departing from the basic scope thereof, and the scope thereof is determined by the claims that follow.

What is claimed is:

1. A method for accessing a database by a messaging facility, comprising:
   receiving, by the messaging facility having at least one message queue, a message containing a database request;
   parsing, by the messaging facility, the message containing the database request to extract the database request;
   submitting, by the messaging facility, the database request to the database;
   receiving, by the messaging facility, results from the database request; and
   sending, by the messaging facility, a message containing results from the database request to the front-end server.

2. The method of claim 1, wherein parsing the message containing the database request comprises extracting text.

3. The method of claim 1, wherein parsing the message containing the database request comprises decoding a portion of the message to extract the database request.

4. The method of claim 1, further comprising establishing a connection with the database prior to submitting the database request to the database.

5. The method of claim 4, wherein establishing a connection with the database comprises submitting a user identification and a user password to the database.

6. A method for accessing a database by a messaging facility, comprising:
   receiving, from a front-end server, a plurality of messages containing database requests in a first message queue of the messaging facility;
   parsing, by the messaging facility, the messages containing the database requests to extract the database requests;
   submitting, by the messaging facility, at least some of the database requests to the database;
   receiving, by the messaging facility, results from the submitted database requests;
   placing messages containing results from the submitted database requests in a second message queue of the messaging facility; and
   sending, by the messaging facility, the messages containing results from the submitted database requests to the front-end server from the second message queue.

7. The method of claim 6, further comprising:
   determining if the database requests include redundant database requests; and
   if so, deleting the redundant database requests prior to submitting at least some of the database requests to the database.

8. The method of claim 6, further comprising: determining if more than one of the database requests include requests to delete overlapping rows; and if so, combining the requests to delete overlapping rows into a single operation prior to submitting at least some of the database requests to the database.

9. The method of claim 6, further comprising: determining if a threshold number of the database requests access a common file in the database; and if so, paging the common file into memory.

10. The method of claim 9, wherein the threshold number is determined by an amount of available memory.

11. The method of claim 6, further comprising:

maintaining a number of database update requests; and submitting the database update requests to the database in response to a commit request from the front-end server.

12. A computer readable medium containing a messaging facility program which, when executed, performs operations for accessing a database, the operations comprising:

receiving, from a front-end server, messages containing database requests in a first message queue of a messaging facility;

parsing, by the messaging facility, the messages to extract the database requests;

submitting, by the messaging facility, the database requests to the database;

receiving, by the messaging facility, results from the database requests;

placing messages containing the results of the database requests in a second message queue of the messaging facility; and sending, by the messaging facility, the messages containing the results from the second queue to the front-end server.

13. The computer readable medium of claim 12, wherein the operation of parsing the messages to extract the database requests comprises extracting parameters for constructing the database request and constructing the database request using the extracted parameters.

14. The computer readable medium of claim 12, wherein the operation of parsing the messages to extract the database requests comprises decoding the database request.

15. The computer readable medium of claim 12, wherein the operations further comprise:

accessing a set of parameters comprising a named database parameter;

establishing a connection with the named database; and wherein submitting the requests to the database comprises submitting the database requests to the named database.

16. The computer readable medium of claim 15, wherein the set of parameters further comprises a database user identification parameter and a database password parameter, and establishing a connection with the named database comprises establishing a connection with the named database using the database user identification parameter and the database password parameter.

17. The computer readable medium of claim 15, wherein the set of parameters further comprises a named results queue parameter and wherein the second queue is the named results queue.

18. A database system, comprising:

a front-end server comprising a first messaging facility and an application configured to send messages containing database requests via the first messaging facility; and a back-end server comprising a database and a second messaging facility configured to receive the messages containing database requests from the application, parse the messages to extract the database requests, submit the database requests to the database, and send messages containing the results from the database requests to the front-end server.

19. The database system of claim 18, wherein:

the first messaging facility is configured to receive the messages containing the results from the back-end server; and the application is further configured to retrieve the messages containing the results from the first messaging facility and post the results to a user interface.

20. The database system of claim 19, wherein the user interface is a web browser.

21. The database system of claim 18, wherein the application is further configured to create the messages containing the database requests by encoding the database requests and embedding the encoded database requests in the messages.

22. The database system of claim 18, wherein the application is further configured to create the messages containing the database requests by embedding the database requests in the message as text.

23. The database system of claim 18, wherein:

the application is further configured to send commit requests to the second messaging facility via the first messaging facility; and the second messaging facility is further configured to maintain a number of database update requests until a commit request is received from the application.

24. A method for processing database requests, comprising:

performing, by messaging facility having at least one message queue, a process comprising:

receiving a plurality of messages in a message queue, wherein the messages contain database requests;

analyzing the database requests;

changing the database requests; and transmitting the database requests to a database.

25. The method of claim 24, wherein changing the database requests comprises changing an order in which the database requests are transmitted to the database.

26. The method of claim 24, wherein changing the database requests comprises deleting at least one database request.

27. The method of claim 24, wherein changing the database requests comprises combining at least two database requests into a single database request.

28. The method of claim 24, further comprising extracting the database requests from the plurality of messages prior to analyzing the database requests.

* * * * *